United States Patent
Nakayama

(10) Patent No.: US 10,704,609 B2
(45) Date of Patent: Jul. 7, 2020

(54) VEHICLE DRIVE DEVICE WITH CONTACT BODY CONTACTING GUIDE SURFACE ON CLUTCH

(71) Applicant: HONDA MOTOR CO., LTD., Tokyo (JP)

(72) Inventor: Shigeru Nakayama, Wako (JP)

(73) Assignee: HONDA MOTOR CO., LTD., Tokyo (JP)

(\*) Notice: Subject to any disclaimer, the term of this patent is extended or adjusted under 35 U.S.C. 154(b) by 30 days.

(21) Appl. No.: 16/223,609

(22) Filed: Dec. 18, 2018

(65) Prior Publication Data
US 2019/0249721 A1    Aug. 15, 2019

(30) Foreign Application Priority Data
Feb. 14, 2018    (JP) .................. 2018-024259

(51) Int. Cl.
*F16D 23/14*    (2006.01)
*F16H 48/36*    (2012.01)
(Continued)

(52) U.S. Cl.
CPC ............... *F16D 11/14* (2013.01); *B60K 1/00* (2013.01); *B60K 17/02* (2013.01); *F16D 23/14* (2013.01); *F16H 48/36* (2013.01); *B60K 2001/001* (2013.01); *F16D 2011/004* (2013.01); *F16D 2011/006* (2013.01); *F16D 2023/123* (2013.01); *F16H 2048/368* (2013.01)

(58) Field of Classification Search
CPC ........ F16H 48/20–24; B60K 2001/001; B60K 1/00; B60K 17/02; F16D 2011/004–006; F16D 23/12; F16D 23/14; F16D 11/04; F16D 11/14; F16D 11/02–08
See application file for complete search history.

(56) References Cited

U.S. PATENT DOCUMENTS 5,038,884 A * 8/1991 Hamada ................ B60K 17/35
                                                180/233
2014/0116180 A1    5/2014 Keller et al.
(Continued)

FOREIGN PATENT DOCUMENTS

JP    S52-101708 U    8/1977
JP    2003-104073    4/2003
(Continued)

OTHER PUBLICATIONS

Japanese Office Action with English translation dated Jul. 9, 2019 (7 pages).

*Primary Examiner* — Jacob S. Scott
*Assistant Examiner* — Lillian T Nguyen
(74) *Attorney, Agent, or Firm* — Rankin, Hill & Clark LLP

(57) ABSTRACT

The vehicle drive device includes the clutch being provided between the speed reducing mechanism and the differential device, and configured to be rotated integrally with the differential device, and moved in the rotation axis direction to engage with or release from the speed reducing mechanism, and the solenoid pin capable of contacting with and separating from the outer peripheral surface of the clutch, the guide groove is formed on the outer peripheral surface of the clutch so as to intersect in the rotation direction of the clutch, and the solenoid pin contacts the guide groove to thereby move the clutch.

14 Claims, 4 Drawing Sheets

(51) Int. Cl.
  *F16D 11/14* (2006.01)
  *B60K 17/02* (2006.01)
  *B60K 1/00* (2006.01)
  *F16D 23/12* (2006.01)
  *F16D 11/00* (2006.01)

(56) References Cited

U.S. PATENT DOCUMENTS

| | | | | |
|---|---|---|---|---|
| 2015/0166035 A1* | 6/2015 | Gieryluk | ............... | F16H 59/02 |
| | | | | 477/86 |
| 2017/0182887 A1* | 6/2017 | Ogawa | ............... | B60K 23/08 |
| 2018/0304732 A1* | 10/2018 | Yu | ............... | B60K 17/12 |
| 2018/0355923 A1* | 12/2018 | Samie | ............... | F16D 19/00 |

FOREIGN PATENT DOCUMENTS

| | | | |
|---|---|---|---|
| JP | 2015-200387 A | 11/2015 | |
| JP | 2017-072067 A | 4/2017 | |

\* cited by examiner

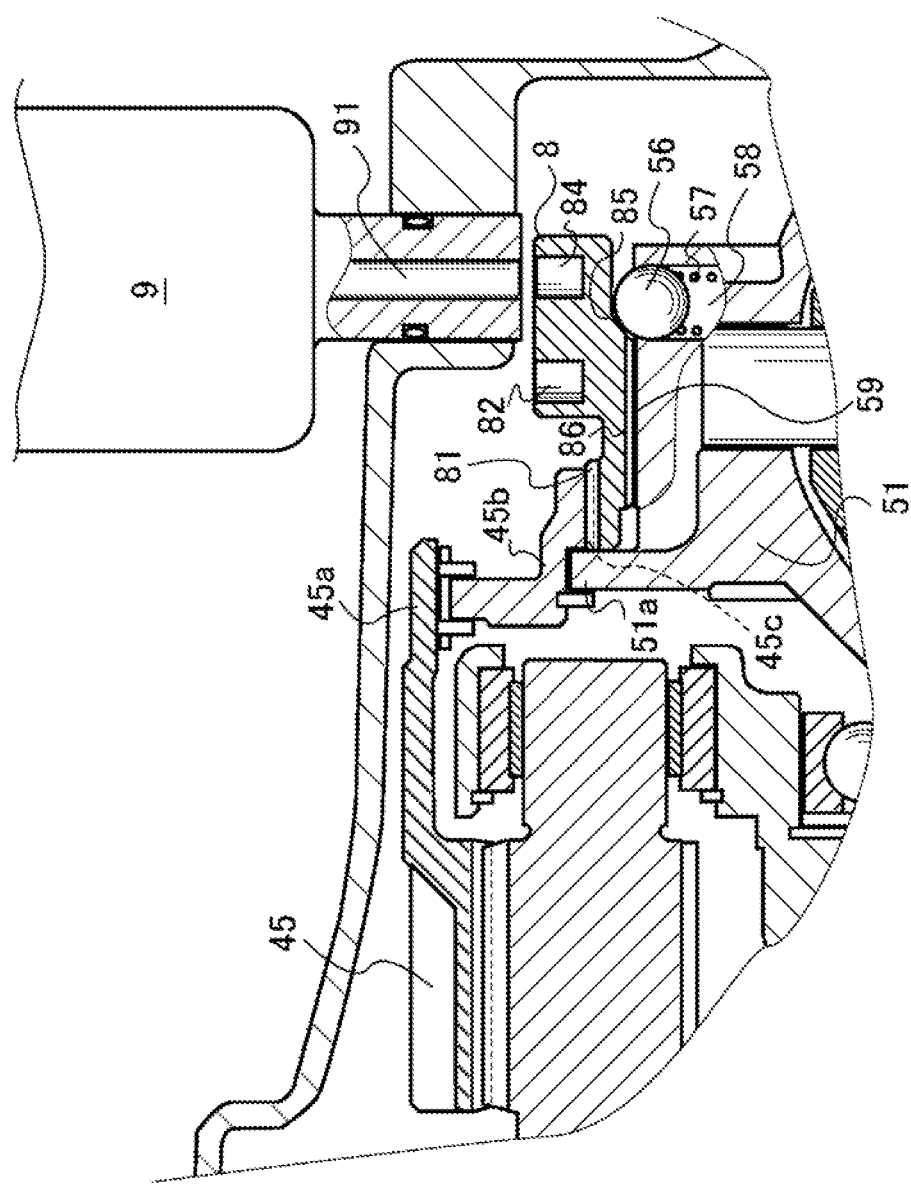

FIG.3A
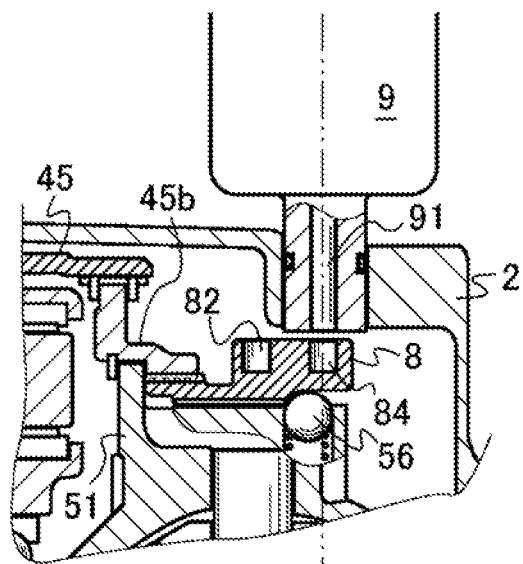
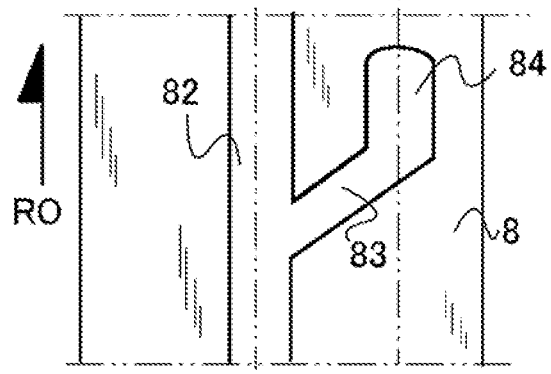
FIG.3B
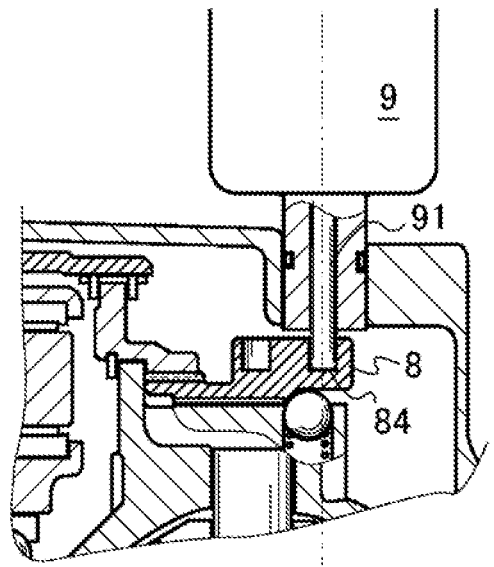
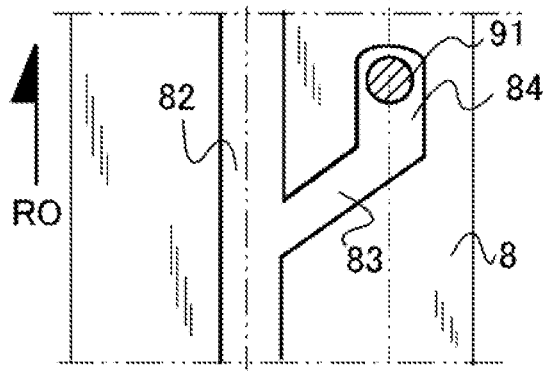

FIG.3C
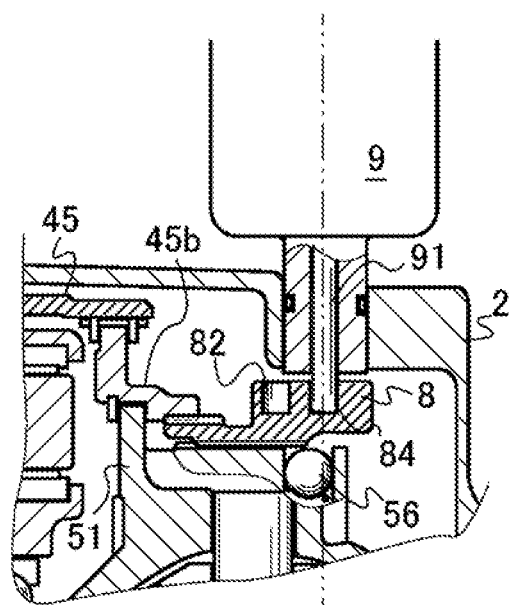
FIG.3D
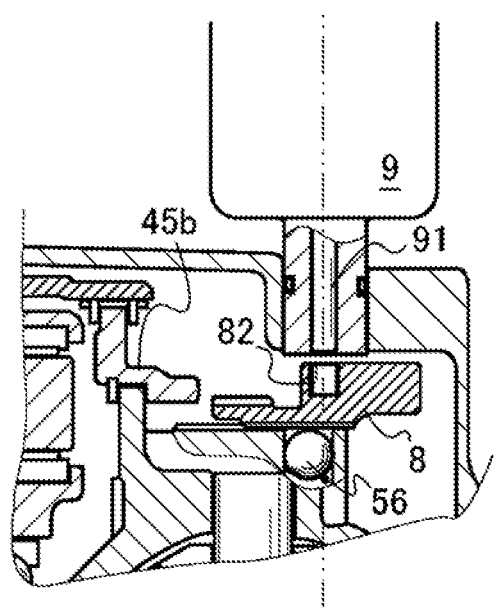
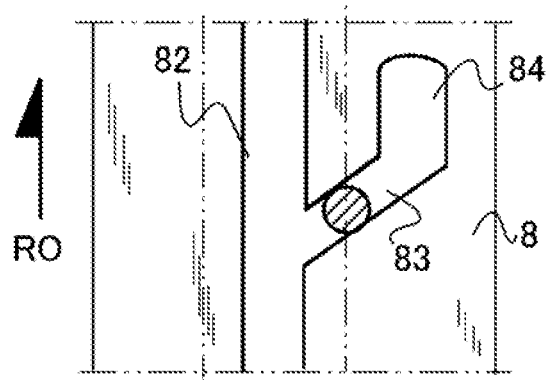
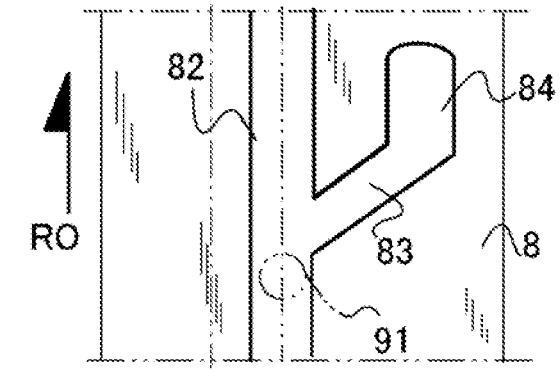

VEHICLE DRIVE DEVICE WITH CONTACT BODY CONTACTING GUIDE SURFACE ON CLUTCH

CROSS-REFERENCE TO RELATED APPLICATION

The present application claims priority under 35 U.S.C. § 119 to Japanese Patent Application No. 2018-024259 filed on Feb. 14, 2018, the entire contents of which are hereby incorporated by reference.

BACKGROUND OF THE INVENTION

Field of the Invention

The present disclosure relates to a vehicle drive device.

Description of the Related Art

As a vehicle drive device which employs a combination of an engine and an electric motor serving as a driving source, there is known a vehicle drive device including an electric motor, a speed reducing mechanism of the electric motor, and a differential device, the vehicle drive device using a clutch to connect and disconnect a driving force between the electric motor and wheels. There is known a vehicle drive device which disconnects a driving force path between the electric motor and the wheels to prevent the electric motor from being rotated by the wheels, thereby protecting a regulator circuit, or the like from electromotive forces produced by the electric motor (for example, see Japanese Patent Laid-Open No. 2003-104073).

However, in the vehicle drive device disclosed in Japanese Patent Laid-Open No. 2003-104073, a multi-plate clutch is used as a clutch. Therefore, the clutch is large in number of components, resulting in a complicated structure being required. When a wet clutch is used, a separate device is used so that the viscosity drag of lubricating oil prevents the electric motor from being rotated.

As a result, a space for the device itself is increased, and a force output larger than the urging force of a clutch spring, or the like is required against the urging force.

The present disclosure has been made in view of the above-described conventional problems, and an object of the present disclosure is to provide a vehicle drive device which can provide a clutch mechanism with a simple configuration and higher responsiveness and can save space and energy.

SUMMARY OF THE INVENTION

To achieve the above-described object, a vehicle drive device of the present disclosure comprises a driving source, a differential device to which a driving force of the driving source is transmitted through a speed reducing mechanism, a clutch being provided between the speed reducing mechanism and the differential device, and configured to be rotated integrally with the differential device, and moved in a rotation axis direction to engage with or release from the speed reducing mechanism, and a contact body capable of contacting with and separating from an outer peripheral surface of the clutch, wherein a guide surface is formed on the outer peripheral surface of the clutch so as to intersect in a rotation direction of the clutch, and the contact body contacts the guide surface to therefore move the clutch.

According to this configuration, since the contact body contacts the guide surface to therefore move the clutch, a clutch mechanism can be provided with a simple configuration, space saving, and energy saving.

In the above-described configuration, a guide groove having the guide surface is provided on the outer peripheral surface of the clutch.

According to this configuration, the guide surface consists of the guide groove, and the contact body is inserted into the guide groove to therefore move the clutch.

In the above-described configuration, the contact body is inserted into the outer peripheral surface of the clutch in a state in which the clutch engages with the speed reducing mechanism, and an introduction groove for introducing the contact body to the guide groove is provided in a rotation direction of the clutch.

According to this configuration, the contact body is inserted into the introduction groove, thereby enabling the contact body to be guided to the guide groove from the introduction groove to therefore move the clutch.

In the above-described configuration, a releasing groove is provided on the outer peripheral surface of the clutch in the rotation direction of the clutch, and the contact body moves along the releasing groove from the guide groove to a position to be held thereto at which the clutch is disengaged from the speed reducing mechanism.

According to this configuration, the contact body is inserted into the releasing groove, thereby enabling the clutch to be moved to at a position at which the clutch is disengaged from the speed reducing mechanism.

In the above-described configuration, a holding mechanism for holding the clutch is provided in a state in which the contact body is positioned in the releasing groove.

According to this configuration, the holding mechanism enables the clutch to be held at a position in which the clutch is disengaged from the speed reducing mechanism.

In the above-described configuration, the contact body is a solenoid pin being driven by a solenoid.

According to this configuration, the solenoid pin is inserted into the introduction groove, the guide groove, and the releasing groove, to therefore move the clutch.

According to the vehicle drive device according to the present disclosure, an electric oil pump for generating a hydraulic pressure for clutch operation and an actuator such as an electromagnetic solenoid are not required between the speed reducing mechanism and the differential device, and therefore a control circuit is not required. Therefore, a clutch mechanism can be provided with a simple configuration, space saving and energy saving. Also, a clutch-off operation with high responsiveness can be performed.

BRIEF DESCRIPTION OF THE DRAWINGS

FIG. 2 is a sectional view illustrating of a configuration of a clutch;

FIGS. 3A and 3B each are a diagram illustrating a first half of a clutch disconnection operation in a configuration of a clutch and an engagement groove; and FIGS. 3C and 3D each are a diagram illustrating a last half of the clutch disconnection operation in a configuration of the clutch and the engagement groove.

DETAILED DESCRIPTION OF THE PREFERRED EMBODIMENT

Embodiment 1

Figure 1:
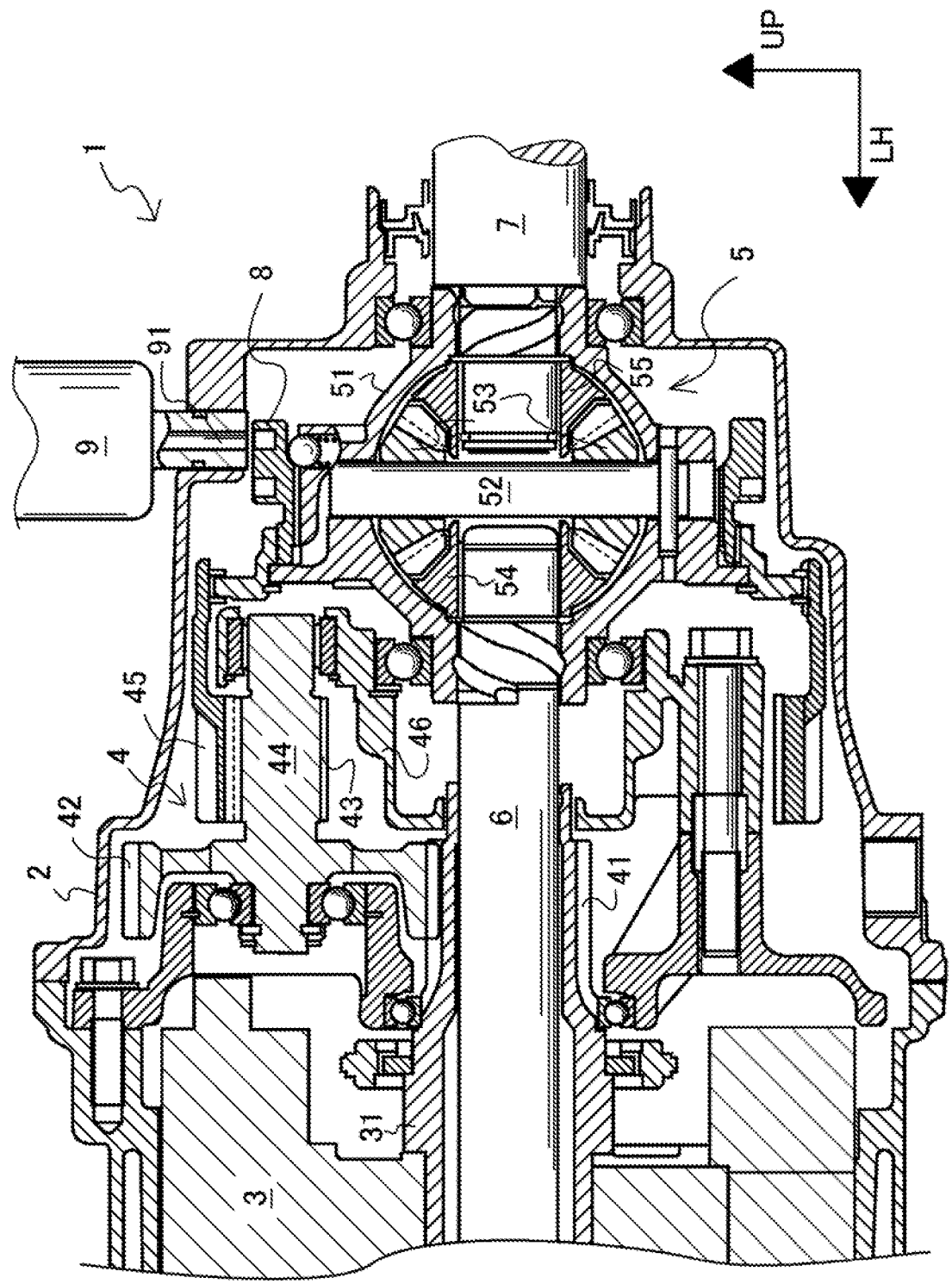
FIG. 1 is a sectional view illustrating of a configuration of a speed reducing mechanism and a differential device of a vehicle drive device.

Hereinafter, an embodiment of the present disclosure will be described with reference to the drawings.

A vehicle drive device 1 according to the embodiment of the present disclosure will be described with reference to FIG. 1 to FIGS. 4A-D.

FIG. 1 is a sectional view illustrating of a configuration of a speed reducing mechanism and a differential device of a vehicle drive device, FIG. 2 is a sectional view illustrating of a configuration of a clutch, FIGS. 3A and 3B each are a diagram illustrating a first half of a clutch disconnection operation in a configuration of the clutch and an engagement groove, and FIGS. 3C and 3D each are a diagram illustrating a last half of the clutch disconnection operation in a configuration of the clutch and the engagement groove.

An overall configuration of the vehicle drive device 1 will be described with reference to FIG. 1.

In FIG. 1, UP indicates an upward direction, and LH indicates a leftward direction. In FIG. 1, the vehicle drive device 1 includes an electric motor 3 serving as a driving source, a speed reducing mechanism 4, and a differential device 5, which are disposed in a case 2. The differential device 5 is connected with an axle 6 and an axle 7.

The electric motor 3 being disposed in the case 2 has an output shaft 31, and outputs electric power as a driving force. The output shaft 31 of the electric motor 3 is a hollow shaft, and the axle 6 is inserted into a hollow portion of the output shaft 31. A sun gear 41 is provided at one end of the output shaft 31, and the sun gear 41 is driven to integrally rotate with the output shaft 31. The sun gear 41 is configured to transmit the driving force to the speed reducing mechanism 4.

The speed reducing mechanism 4 includes the sun gear 41, a first planetary gear 42, a second planetary gear 43, a shaft 44, and a ring gear 45.

The first planetary gear 42 being rotatably supported on a carrier 46 engages with the sun gear 41, and the first planetary gear 42 is formed integrally with the second planetary gear 43 through the shaft 44. The first planetary gear 42 and the second planetary gear 43 are configured to be integrally rotated, and the number of teeth of the first planetary gear 42 is larger than that of the second planetary gear 43.

The second planetary gear 43 of the speed reducing mechanism 4 engages with the ring gear 45. The ring gear 45 is rotated around the same rotation axis as the sun gear 41 by the driving force which is transmitted by the second planetary gear 43. The ring gear 45 is connected to the differential device 5 through a clutch 8 which is moved in a rotation axis direction.

Note that the carrier 46 is fixed to the case 2, and the speed reducing mechanism 4 is a star-type planetary speed reducing mechanism.

The differential device 5 includes a differential case 51, a pinion shaft 52, two pinions 53, a left-side side gear 54, and a right-side side gear 55. In the differential case 51, the pinion shaft 52 is fixed to be perpendicular to the axle 6 and the axle 7. The two pinions 53 are fitted around the pinion shaft 52, and the two pinions 53 engage with the side gear 54 and the side gear 55, respectively.

The side gear 54 is fixed to one end of the axle 6 in the differential case 51, so that the side gear 54 is rotated integrally with the axle 6. The side gear 55 is fixed to one end of the axle 7 in the differential case 51, so that the side gear 55 is rotated integrally with the axle 7.

Note that the differential case 51 is disposed at a position overlapping with the ring gear 45 of the speed reducing mechanism 4 in the rotation axis direction of the speed reducing mechanism 4. In other words, as illustrated in FIG. 1, a part of the differential case 51 is inserted into the ring gear 45.

Thus, in the vehicle drive device 1, the driving force of the electric motor 3 is reduced in speed by the speed reducing mechanism 4, and is then transmitted to the axle 6 and the axle 7 through the differential device 5 which is connected to the speed reducing mechanism 4.

A solenoid 9 is attached to the outside of the case 2, and a solenoid pin 91 (contact body) of the solenoid 9 can contact the clutch 8.

The solenoid 9 is configured to move the clutch 8 which is attached to the differential device 5, and this enables to select whether to transmit the driving force of the speed reducing mechanism 4 and the differential device 5.

Next, a configuration of the clutch 8 will be described with reference to FIG. 2.

The clutch 8 includes a dog sleeve for containing the differential device 5. The clutch 8 is formed in a cylindrical shape, and the clutch 8 is attached to the differential case 51 of the differential device 5.

Thus, the clutch 8 is driven to integrally rotate with the differential case 51, and is movable in the rotation axis direction of the differential case 51 (corresponding to an extending direction of the axle 6 or the axle 7).

An engagement portion 86 is provided on an inner peripheral surface of the clutch 8, and the engagement portion 86 of the clutch 8 engages with an engagement portion 59 being provided on an outer peripheral surface of the differential case 51. Each of the engagement portion 86 and the engagement portion 59 is configured with a groove extending in the rotation axis direction of the differential case 51, and the groove of the engagement portion 86 and the groove of the engagement portion 59 engage with each other so that the clutch 8 is driven to integrally rotate with the differential case 51, thereby enabling the clutch 8 to be moved in the rotation axis direction with respect to the differential case 51.

A stopper 51a forming a part of the differential case 51 is provided on the outer periphery of the differential case 51, the stopper 51a extending in a radially outward direction. One side surface of the stopper 51a can contact an end portion on the speed reducing mechanism 4 side of the clutch 8, thereby restricting movement of the clutch 8 toward the speed reducing mechanism 4.

Note that the stopper 51a is positioned inside the ring gear 45.

A stepped portion 85 is formed on an inner peripheral side of the clutch 8. A hole 58 extending in a radial direction of the differential case 51 is formed in the outer peripheral surface of the differential case 51, and a ball 56 is received in this hole 58. The ball 56 is urged in the radially outward direction by an urging force of a spring 57 being housed inside. A holding mechanism is comprised of the ball 56, the hole 58, and the spring 57.

When the clutch 8 is ready for transmitting the driving force of the speed reducing mechanism 4 and the differential device 5, the ball 56 contacts the stepped portion 85 of the clutch 8, and the stepped portion 85 of the clutch 8 has a shape along an external shape of the ball 56.

When the clutch 8 is moved, the stepped portion 85 of the clutch 8 adds a force exceeding the urging force of the spring 57 to the ball 56, so that the ball 56 is pushed into the hole 58, thereby allowing movement of the clutch 8. In this state, the ball 56 contacts the inner peripheral surface of the clutch 8 by the urging force of the spring 57, thereby restricting movement of the clutch 8 in the rotational axis direction with respect to the differential case 51.

The clutch 8 engages with the ring gear 45 through the engagement portion 45*b* being fixed to the ring gear 45. The engagement portion 45*b* is attached to the inside of an end portion 45*a* of the ring gear 45, and a groove portion 45*c* is provided in the inner peripheral surface of the engagement portion 45*b*. The engagement portion 45*b* engages with the outer peripheral portion of the stopper 51*a* of the differential case 51, thereby capable of securing the arrangement accuracy of the engagement portion 45*b* with respect to the differential case 51.

An external tooth gear 81 is provided on the speed reducing mechanism 4 side of the clutch 8, and the groove portion 45*c* of the engagement portion 45*b* engages with the external tooth gear 81 of the clutch 8, thereby enabling the clutch 8 to be integrally rotated with the ring gear 45.

The external tooth gear 81 of the clutch 8 is a spur gear, and the groove portion 45*c* has a shape which engages with the external tooth gear 81. Thus, the external tooth gear 81 of the clutch 8 is movable in the rotation axis direction of the clutch 8 in a state in which the external tooth gear 81 engages with the groove portion 45*c*.

Note that when the external tooth gear 81 has a spline tooth gear, and the groove portion 45*c* has a boss shape corresponding to the spline tooth gear, the engagement portion 45*b* can be in spline engagement with the clutch 8. When the engagement 45*b* engages with the clutch 8, the other engagement structure may be used to rotate the engagement portion 45*b* integrally with the clutch 8.

FIGS. 3A and 3B each are a diagram illustrating a first half of a clutch disconnection operation in a configuration of the clutch and the engagement groove. FIG. 3A is a diagram illustrating a state before the solenoid pin 91 contacts an introduction groove 84, and FIG. 3B is a diagram illustrating a state in which the solenoid pin 91 contacts the introduction groove 84.

FIGS. 3C and 3D each are a diagram illustrating a last half of the clutch disconnection operation in a configuration of the clutch and the engagement groove. FIG. 3C is a diagram illustrating a state in which the solenoid pin 91 contacts a guide groove, and FIG. 3D is a diagram illustrating a state when disconnection of the clutch has been completed.

As illustrated in FIGS. 3A and 3B and FIGS. 3C and 3D, the engagement groove into which the solenoid pin 91 serving as a contact body of the solenoid 9 is to be inserted is formed along an outer peripheral surface of the clutch 8. The engagement groove includes the introduction groove 84 being provided at a certain distance along the outer peripheral surface of the clutch 8, the guide groove 83, and a releasing groove 82 being provided to surround the outer peripheral surface of the clutch 8.

The introduction groove 84 is a groove for introducing the solenoid pin 91 serving as a contact body into the engagement groove. The introduction groove 84 is provided intermittently in the rotation direction of the clutch on the outer peripheral surface of the clutch 8. The introduction groove 84 is formed in parallel with the releasing groove 82.

A terminal end of the introduction groove 84 is connected with a starting end of the guide groove 83.

When the solenoid pin 91 engages with the introduction groove 84, the clutch 8 is held in a state where the groove portion 45*c* of the engagement portion 45*b* engages with the external tooth gear 81 of the clutch 8 as illustrated in FIG. 2, so that the clutch 8 can be rotated integrally with the ring gear 45.

Note that a plurality of introduction grooves 84 may be provided intermittently on the outer peripheral surface of the clutch 8, and in so doing, it is only required that a plurality of guide grooves 83 are provided so that each of the introduction grooves 84 is connected with each of the guide grooves 83.

The guide groove 83 is formed diagonally in a counter-rotation direction so as to intersect in the rotation direction of the clutch 8. The terminal end of the guide groove 83 is connected to the releasing groove 82. This inclined surface of the guide groove 83 rising from the releasing groove 82 is a guide surface of the clutch 8.

The releasing groove 82 is formed continuously in the rotation direction on the outer peripheral surface of the clutch 8.

When the solenoid pin 91 engages with the releasing groove 82, the clutch 8 is held in a state where the groove portion 45*c* of the engagement portion 45*b* is disengaged from the external tooth gear 81 of the clutch 8, so that the differential case 51 is not rotated by the ring gear 45.

Next, the operation of the clutch 8 will be described with reference to FIGS. 3A and 3B and FIGS. 3C and 3D.

Note that in FIGS. 3A and 3B and FIGS. 3C and 3D, a reference sign RO represents a rotation direction of the clutch 8, and two-dot chain lines L represents a position of the solenoid pin 91 on a rotation axis line.

As illustrated in FIG. 3A, when power is not applied to the solenoid, the solenoid pin 91 is held in a retracted state, and therefore the solenoid pin 91 does not engage with the introduction groove 84. At this time, when the clutch 8 engages with the ring gear 45, the introduction groove 84 in the rotation axis direction of the clutch 8 is positioned to correspond to the solenoid pin 91 of the solenoid 9.

In this case, the ring gear 45 engages with the clutch 8, and the rotational driving force of the electric motor 3 is transmitted to the differential device 5 through the speed reducing mechanism 4.

As illustrated in FIG. 3B, when power is applied to the solenoid 9, the solenoid pin 91 protrudes from the solenoid 9, the clutch 8 is rotated, and the solenoid pin 91 is inserted into the introduction groove 84 when the position of the solenoid pin 91 agrees with the position of the introduction groove 84.

Thus, the solenoid pin 91 being inserted into the introduction groove 84 of the rotating clutch 8 is relatively moved from the introduction groove 84 to the guide groove 83, as illustrated in FIG. 3C.

When the clutch 8 is further rotated, the solenoid pin 91 is relatively moved from the guide groove 83 to the releasing groove 82.

Thus, when the solenoid pin 91 is moved along the introduction groove 84, the guide groove 83, and the releasing groove 82, the clutch 8 is relatively moved in the rotation axis direction of the clutch 8, and the engagement between the ring gear 45 and the clutch 8 is released. Therefore, the rotational driving force of the electric motor 3 is not transmitted to the differential device 5.

At this time, as illustrated in FIG. 3D, when the clutch 8 is moved, and the releasing groove 82 reaches the position of the solenoid pin 91, power supply of the solenoid 9 is stopped, so that the solenoid pin 91 is held in a state in which the solenoid pin 91 is retracted in the solenoid 9. Since the ball 56 contacts the inner peripheral surface of the clutch 8, the position of the clutch 8 with respect to the differential case 51 can be securely held even when the solenoid pin 91 is retracted.

Note that in the present embodiment, a part of the driving force being applied to the clutch 8 is converted to a force in a moving direction of the clutch 8 by the guide groove 83 and the solenoid 9. Thus, the solenoid 9 may output a force smaller than an urging force for holding the clutch 8 in an engaged state (in the present embodiment, the urging force by the spring 57 through the ball 56).

As described above, the vehicle drive device in the present embodiment includes the clutch 8 being provided between the speed reducing mechanism 4 and the differential device 5, and configured to be rotated integrally with the differential device 5, and moved in the rotation axis direction to engage with or release from the speed reducing mechanism 4, and the solenoid pin (contact body) capable of contacting with and separating from the outer peripheral surface of the clutch 8, the guide groove 83 (guide surface) is formed on the outer peripheral surface of the clutch 8 so as to intersect in the rotation direction of the clutch 8, and the solenoid pin 91 contacts the guide groove 83, to thereby move the clutch 8.

In this way, an electric oil pump for generating a hydraulic pressure for clutch operation and an actuator such as an electromagnetic solenoid are not required between the driving electric motor 3 and the differential device 5, and therefore a control circuit is not required. Therefore, a clutch mechanism can be provided with a simple configuration, space saving and energy saving. Also, a clutch-off operation with high responsiveness can be performed.

Note that, the above-described embodiment is only for the purpose of illustrating one aspect of the present disclosure, and may be optionally be modified or applied without departing from the spirit of the present disclosure.

Also, the above-described embodiment can be applied to the other clutch mechanism.

REFERENCE SIGNS LIST

1 Vehicle drive device
2 Case
3 Electric motor
4 Speed reducing mechanism
5 Differential device
8 Clutch
9 Solenoid
45 Ring gear
45*a* End portion of ring gear
45*b* Engagement portion
45*c* Groove portion
51 Differential case
51*a* Stopper
56 Ball
57 Spring
58 Hole
59 Engagement portion
81 External tooth gear
82 Releasing groove
83 Guide groove
84 Introduction groove
85 Stepped portion
86 Engagement portion
91 Solenoid pin

What is claimed is:

1. A vehicle drive device, comprising:
   a driving source;
   a differential device to which a driving force of the driving source is transmitted through a speed reducing mechanism;
   a clutch being provided between the speed reducing mechanism and the differential device, and configured to be rotated integrally with the differential device, and moved in a rotation axis direction to engage with or release from the speed reducing mechanism; and
   a contact body capable of contacting with and separating from an outer peripheral surface of the clutch,
   wherein a guide surface is formed on the outer peripheral surface of the clutch so as to intersect in a rotation direction of the clutch, and the contact body contacts the guide surface to move the clutch.

2. The vehicle drive device according to claim 1, wherein a guide groove having the guide surface is provided on the outer peripheral surface of the clutch.

3. The vehicle drive device according to claim 2, wherein the contact body is inserted into the outer peripheral surface of the clutch in a state in which the clutch engages with the speed reducing mechanism, and an introduction groove for introducing the contact body to the guide groove is provided in a rotation direction of the clutch.

4. The vehicle drive device according to claim 3, wherein a releasing groove is provided on the outer peripheral surface of the clutch in the rotation direction of the clutch, and
   the contact body moves along the releasing groove from the guide groove to a position to be held thereto at which the clutch is disengaged from the speed reducing mechanism.

5. The vehicle drive device according to claim 4, wherein a holding mechanism for holding the clutch is provided in a state in which the contact body is positioned in the releasing groove.

6. The vehicle drive device according to claim 5, wherein the contact body is a solenoid pin being driven by a solenoid.

7. The vehicle drive device according to claim 4, wherein the contact body is a solenoid pin being driven by a solenoid.

8. The vehicle drive device according to claim 3, wherein the contact body is a solenoid pin being driven by a solenoid.

9. The vehicle drive device according to claim 2, wherein a releasing groove is provided on the outer peripheral surface of the clutch in the rotation direction of the clutch, and
   the contact body moves along the releasing groove from the guide groove to a position to be held thereto at which the clutch is disengaged from the speed reducing mechanism.

10. The vehicle drive device according to claim 9, wherein
    a holding mechanism for holding the clutch is provided in a state in which the contact body is positioned in the releasing groove.

11. The vehicle drive device according to claim 10, wherein
    the contact body is a solenoid pin being driven by a solenoid.

12. The vehicle drive device according to claim 9, wherein
    the contact body is a solenoid pin being driven by a solenoid.

13. The vehicle drive device according to claim 2, wherein
    the contact body is a solenoid pin being driven by a solenoid.

14. The vehicle drive device according to claim 1, wherein
the contact body is a solenoid pin being driven by a solenoid.

* * * * *